No. 728,572. Patented May 19, 1903.

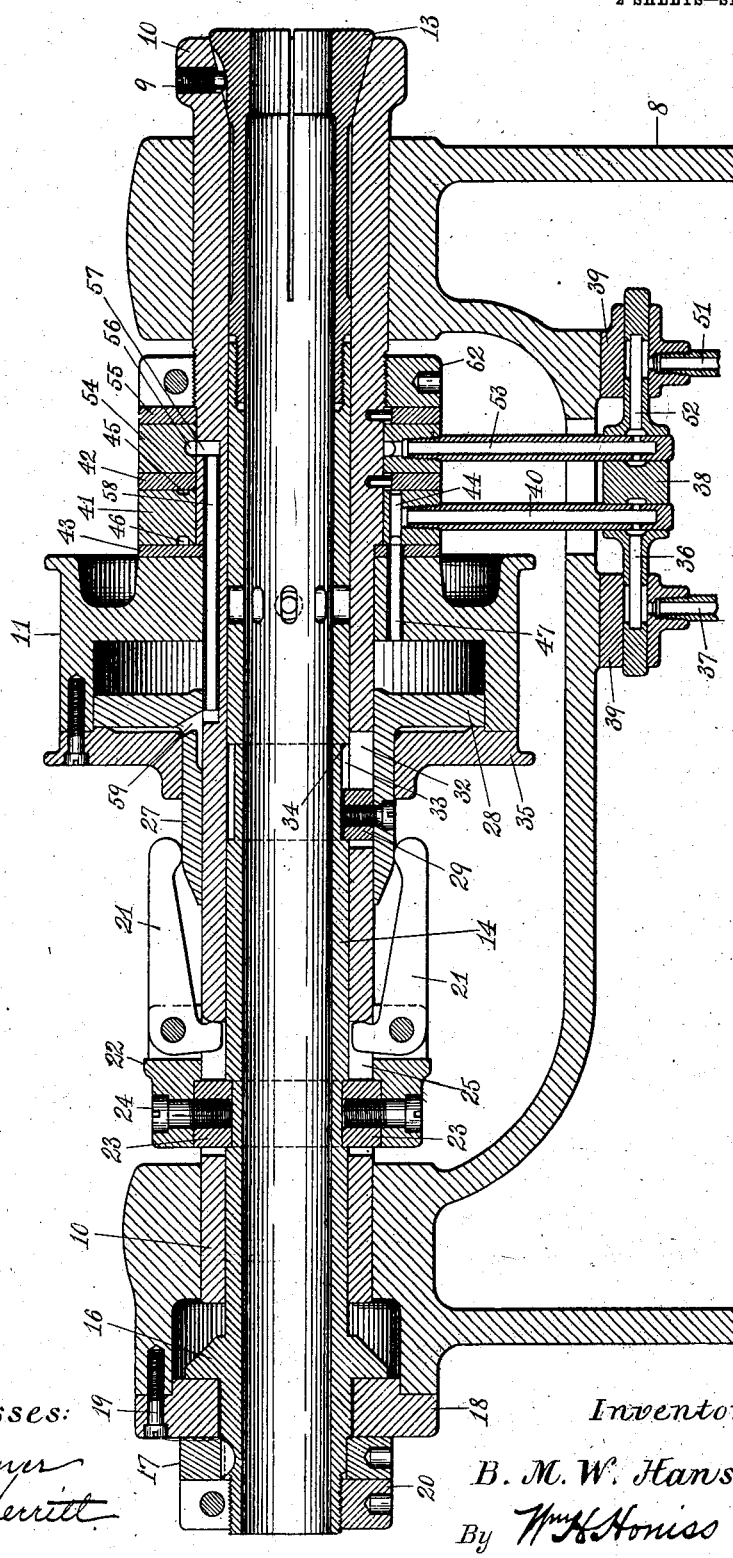

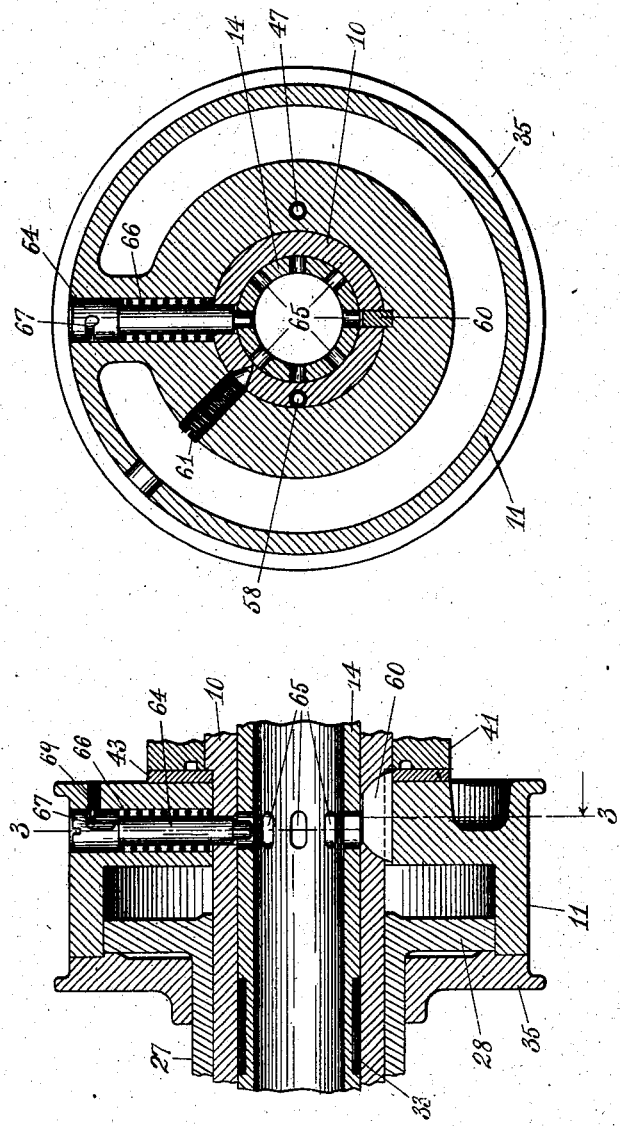

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-PRESSURE-OPERATED CHUCK.

SPECIFICATION forming part of Letters Patent No. 728,572, dated May 19, 1903.

Application filed January 20, 1902. Serial No. 90,486. (No model.)

*To all whom it may concern:*

Be it known that I, BENGT M. W. HANSON, a citizen of Sweden, and a resident of Hartford, in the county of Hartford and State of Connecticut, have invented certain new and useful Improvements in Fluid-Pressure-Operated Chucks, of which the following is a specification.

This invention is an improved chuck or work-gripping device adapted to be rotated and adapted to be operated during rotation at any desired speed without imposing any frictional resistance to the rotation of the device either by end thrust upon the bearings or otherwise.

The embodiment of my invention shown herein is intended for gripping, rotating, and releasing rods of stock or tools in a lathe, screw-machine, or similar machinery.

Figure 1 of the drawings is a side view, in longitudinal section, taken through the center of the spindle. Fig. 2 is a fragmentary plan showing a portion of the device in section, also taken through the center of the spindle, but at right angles to the section shown in Fig. 1. Fig. 3 is an end view in section taken on the line 3 3 of Fig. 2.

These devices are herein shown to be mounted in a head 8, which may be attached to or integral with the frame or bed of the lathe, screw-machine, or other machine with which the apparatus may be employed. Although the principal rotatable portion of this apparatus is made in several parts for economy of manufacture and convenience of assembling, these rotatable parts when assembled constitute three principal parts which rotate together, two of which are moved longitudinally with relation to the third part by the pressure devices employed to operate the chuck for gripping and releasing the work, the third part being preferably held against longitudinal movement. One of the two longitudinally-movable parts is provided with a cylinder and the other with a piston working therein, the pressure being applied between the piston and the cylinder to move them longitudinally of the third part. This relative longitudinal movement of the three parts is utilized to operate the chuck opening and closing devices. In this embodiment the members directly comprising the chuck and its operating devices are the collet 13 and the hollow spindle 10. The collet is of the well-known form, bored or ground out to suit the diameter of the work or tool and split lengthwise to form contractible jaws which clamp upon the work, the collet being tapered in the usual way and resting in a correspondingly-tapering seat in the spindle 10. A suitable key, as the cylinder-pointed screw 9, engages with a splineway of the collet to prevent it from turning with relation to the spindle 10. To facilitate the ready insertion, removal, and attachment of the collet to a suitable longitudinal position, to grip the work properly, and to permit the ready substitution of collets of other sizes, the collet does not extend integrally through the spindle, but is connected with a plunger 14 by means of a screw-thread. The plunger 14 extends through the rearward bearing of the head 8 and is held against longitudinal movement by its collar 16, which bears against the inner side of the flange 18, secured to the rearward side of the bar by screws 19. The forward thrust upon the collet-plunger is sustained by the collar 17, which is keyed to the plunger 14 and is adjusted and held to place by the clamping collar or nut 20.

The spindle 10 is journaled at its forward end in the front bearing on the head 8 and forms a tapering bearing at that end for the collet 13, as already described. The rear end of the spindle 10 is journaled in the rearward bearing against lateral movement and forms a lateral bearing for that end of the collet-plunger 14. The main spindle 10 is, however, free to move longitudinally, closing the collet 13 by its forward movement and by its rearward movement allowing that collet to spring open.

The thrust for moving the spindle 10 longitudinally is wholly taken between that spindle and the collet-plunger 14, and no thrust, either longitudinally or transverse, is thrown upon their bearings in the head 8. The longitudinal movement is imparted by means of one or more levers 21, two being preferably employed, which are bell-cranked and disposed on opposite sides of the spindle, as herein shown. These levers are pivotally mounted in the fulcrum-collar 22, which surrounds the main spindle 10 and is provided with the segmental thrust-blocks 23, preferably two in number, which are attached to the collar by means of screws 24 and engage between the periphery shoulders of the collet-plunger 14, the wall of the main spindle 10 being slotted at 25 to permit the entrance of the thrust-blocks and the inner ends of the bell-cranked levers 21, as shown in Fig. 1. The forward sides of the inner ends of these levers bear against the shoulders of the spindle 10 at the ends of the slots 25, and thus serve to move that spindle forwardly when the forward or outer ends of the levers are moved outwardly, the thrust reacting upon the collet-plunger 14 through the thrust-blocks 23.

As a means for moving the forward ends of the levers 21 outwardly the main spindle 10 is provided with a fluid-pressure cylinder and piston, which rotate with the chuck. The cylinder 11, which also serves as a pulley for the main spindle, is bored to receive the piston 28, the left-hand or rearward end of the cylinder being closed by the flanged cylinder-head 35, fitting around the outside of the cylindrical projection 27 of the piston, which thus extends through the cylinder-head into engaging relation with the levers 21, the engaging surfaces of the piston being beveled to push the levers outwardly by the rearward movement of the piston. Upon the interior of the projection 27 of the piston is secured the segmental thrust-block 29, which projects through the slot 32 in the wall of the spindle 10 into the peripheral groove 33 of the collet-plunger 14. The width of that groove is considerably greater than the width of the thrust-block 29, the function of the thrust-block being to stop the forward movement of the piston 28 when the forward or right face of that block reaches the forward end or shoulder 34 of the groove 33, as will hereinafter appear.

The cylinder is double-acting, the fluid-pressure being admitted alternately to the opposite side of the piston 28 by means of ports and passages which communicate with a source of fluid-pressure supply, the admission and exhaust to and from the cylinder being controlled by valve mechanism, which forms no part of the present invention and is not herein shown.

The pressure for moving the piston rearwardly to expand the levers 21 and close the collet is conducted from the valve through the pipe 37 and through the passage in the yoke 38, which is fitted at its ends to slide longitudinally in the brackets 39. The passages from the yoke 38, which communicate with the inlet-passage 37 and with the passage in the vertical pipe 40, are balanced by opening equally upon opposite sides, so that no resistance is offered by the pressure to the free sliding movement of the yoke. The upper end of the pipe 40 is fitted into the collar 41, which turns loosely upon the outside of the main spindle 10, between the washers 42 and 43, both of which are keyed to rotate with the spindle. The pressure from the pipe 40 passes into the longitudinal passage 44, which extends through the collar and communicates with the annular passages 45 and 46, which extend around the opposite faces of the collar and are of equal area, so as to balance the pressure and permit the collar 41 to remain at rest between its adjacent turning washers. The annular passage 46 communicates at all times with the longitudinal passage 47, which passes through the forward wall of the cylinder 11 into the piston-opening and takes effect to move the parts to the position shown in Fig. 1, thereby expanding the levers 21 and moving the main spindle 10 forward to compress the collet upon the work.

The fluid-pressure for moving the piston forwardly to release the collet passes from the controlling-valve through the inlet 51 through the communicating passage 52 in the forward end of the yoke 38, which passage is balanced like the corresponding passage 36 at the rearward end of that yoke and communicates with a vertical pipe 53, the upper end of which is fitted into the collar 54, which fits upon the outer side of the spindle 10 between the rotating washers 42 and 55, the passage of the pipe communicating with the annular passage 56 upon the interior of that washer. The corresponding portion of the wall of the spindle 10 is provided with an inlet 57, which communicates at all times with some portion of the annular passage 56 and communicates by means of the longitudinal passage 58 with the passage 59 through the piston 28, leading to the rearward or left-hand side thereof, as viewed in Fig. 1. The passage 59 is extended longitudinally, so as to remain in communication with the passage 58 at all positions of the piston.

The cylinder 11 is utilized as a pulley, and its outer periphery is adapted to receive a belt or any other suitable connection for imparting rotary movement to the parts. The cylinder is fitted upon the outside of the spindle 10 and is fixed thereon by any approved means, as the key 60 and the pointed set-screw 61. (Shown in Figs. 2 and 3, respectively.) The washers 42, 43, and 55, which separate the cylinder and the collars 41 and 54, are also fixed upon the spindle 10 to turn therewith, being adjusted longitudinally and maintained in proper relation to those collars to allow them to turn with sufficient freedom without permitting the leakage of the fluid-pressure by means of the clamping collar or nut 62.

In order to enable the collet to be adjusted so as to grip more or less tightly upon the work or to adapt it to suit variations in sizes of the stock or of the tools to be gripped, as well as to enable the collet to be readily removed and others of different size substituted, the collet is made separable from its plunger 14 by means of a screw-thread. The collet being held from turning with relation to the spindle 10 by means of the key or screw 9, it is only necessary to lock or latch the plunger 14 also to the spindle 10 in order to prevent the collet from unscrewing from its plunger while in use. This is accomplished in the present instance by means of a bolt 64, which, as best shown in Figs. 2 and 3, is fitted in the pulley 11 in alinement with a series of slots 65 around the periphery of the collet-plunger 14. The inner end of the bolt engages with one of these holes, which are elongated, as best shown in Fig. 2, to permit of the relative longitudinal movement of the spindle and the plunger. By retracting the bolt 64 the plunger may be turned, by means of a spanner-wrench applied to one of the collars 17 or 20, until the collet is adjusted longitudinally, so as to grip properly upon the work or tool which it is to carry, the bolt being then inserted in one of the series of holes 65. In order to enable the bolt to be readily retracted and replaced when the collet is thus to be adjusted, the bolt is preferably provided with a spring 66, which tends to press it outwardly, and the head of the bolt is provided with a bayonet-slot 67, which receives the projecting end of a pin or screw 69. The outer end of the bolt is slotted, as shown in Fig. 2, so that by applying a screwdriver the bolt may be turned far enough to bring the longitudinal portion of the slot 65 into coincidence with the point of the screw 69, which permits the bolt to be pushed outwardly by its spring far enough to release the spindle 14 and enable it to be adjusted to its new position, after which the bolt is pushed inwardly and turned to the position shown in Fig. 2, the screw resting in a slight depression at the end of the lateral extension of the slot 69, (best shown in Fig. 3,) so as to prevent accidental releasing of the bolt.

In the operation of this device, after the collet is adjusted to position, when it is desirable to grip the stock the fluid-pressure is admitted through the outlet 37 to the space at the right of the piston 28, thus moving that piston to the left to the position shown in Fig. 1 and expanding the levers 21, the shorter inner ends of which move the spindle 10 forwardly and close the collet. It will be seen that both the pulley-cylinder 11 and the piston 28 move longitudinally, but in opposite directions, the pulley being carried forward or to the right not only by reason of the pressure in the cylinder, but mainly because of being carried by the spindle 10 as the latter is pushed forward by the levers 21. The reaction of the forward pressure takes effect through the fulcrum-collar 22 and the thrust-blocks 23 upon the collet-plunger 24, and as the action and reaction are equal no longitudinal or other strain is thrown upon any bearings of the spindle or of the head. Hence all the parts work with perfect freedom without interfering with the rotative speed or power of the chuck.

When the projection 27 of the piston 28 is shaped so that the ends of the levers pass over the inclined ends of the projection and rest upon the parallel sides, as shown in Fig. 1, when the work is gripped, the air-pressure may be shut off throughout the time that the work is being operated upon and until it is desired to unlock the chuck, and this may be done where the work to be gripped is substantially uniform in size; but where that size varies to any considerable extent the inclined ends of the projection 27 of the piston may be longer, so that the levers always rest upon some portion of the inclination and do not pass over the crown thereof, as herein shown. In this way work that varies considerably in size may be gripped with uniform security. In that case, however, it would usually be necessary to leave the pressure on through the inlet 37 while the work is being operated upon in order to maintain the grip of the chuck.

When it is desired to unlock or loosen the chuck and release the work therefrom, the pressure is admitted through the outlet 51 to the space at the left-hand side of the piston 28, thereby withdrawing the piston from the levers 21. In order to insure the loosening of the chuck or collet in case it should remain jammed in the taper after the pressure is removed, one or more of the thrust-blocks 29 are employed. The longitudinal movement of the thrust-block 29 in the groove 33 is somewhat less than the permissible relative movement of the piston 28 and the pulley-cylinder 11. As the piston moves toward the right under the pressure from the inlet 51 the thrust-blocks 29 collide with the shoulder 34 of the collet-plunger at the forward end of the groove 33, thus preventing further forward movement of the piston. The continuing pressure reacts upon the pulley-cylinder 11 to move it and its spindle 10 to the left, thereby opening the tapering joint, allowing the collet 13 to open.

The passages 47 and 58 are preferably, as herein shown, formed of tubing passing through drilled holes in the respective parts, so as to reduce or avoid any leakage of the pressure.

The levers, which are herein shown to be two in number and to be bell-cranked for converting the direction of movement, may be of any other number or forms or kinds suited to the environment or to the direction in which the forces are to be applied or converted. These levers are herein shown to be of proportions which considerably multiply the force exerted by the piston, so as to apply a powerful grip to the work. Obviously, however, these proportions may and should be adapted to the requirements of the work to be done. Obviously, also, the cylinder and its piston may be transposed as to position and direction of operation in many ways that will suggest themselves to mechanics skilled in this art.

I claim as my invention—

1. The combination with a rotatable chuck, of fluid-pressure devices mounted to rotate with the chuck, a lever for operating the chuck, operably connected with the fluid-pressure devices, and means for confining to the rotating members the longitudinal thrust due to operating the chuck.

2. The combination with a rotatable chuck, of fluid-pressure devices mounted to rotate with the chuck, a lever for operating the chuck, located intermediate the pressure devices and the gripping devices of the chuck, and means for confining to the rotating members of the chuck the thrust due to operating the chuck.

3. The combination in a rotatable chuck, of a lever for operating the chuck-jaws, and a fluid-pressure-operated device carried by the chuck and operably engaging with the lever.

4. The combination in a rotatable chuck, of a cranked lever for operating the chuck-jaws, and a fluid-pressure-operated device appurtenant to and rotating with the chuck for engaging with and operating the lever.

5. The combination in a rotatable chuck, of a spindle, a work-gripping collet carried by the spindle, a lever operatively connected with the spindle and collet, and fluid-pressure-operated devices mounted on the chuck to rotate therewith, and operably engaging with the lever.

6. The combination in a rotatable chuck, of a spindle, a work-gripping collet carried thereby, a pair of cranked levers mounted to engage with the collet and spindle, a fluid-pressure engine mounted to rotate on and with the chuck, and means for effecting engagement between the engine and the levers to operate the chuck.

7. The combination in a rotatable chuck, of a spindle, a collet coöperating therewith for gripping the work, a lever operatively engaging with the spindle and the collet, and a fluid-pressure-operated cylinder and piston mounted on the chuck to rotate therewith, and means for effecting engagement between the said fluid-pressure devices and the lever to operate the chuck.

8. The combination in a rotatable chuck, of a longitudinally-movable spindle, a work-gripping collet carried thereby, and held against longitudinal movement, a pair of cranked levers mounted to engage with the collet and the spindle, a cylinder for fluid-pressure carried by the spindle, a piston working in the cylinder, and means for effecting engagement between the piston and the levers to operate the chuck.

9. The combination in a rotatable chuck, of a spindle, a work-gripping collet carried thereby, a lever engaging with the spindle, and the collet, a fluid-pressure-operated cylinder and piston mounted on and rotating with the spindle, and engaging with the lever, the piston being provided with a thrust-collar for engaging with the collet.

10. The combination in a rotatable chuck, of a spindle, a work-gripping collet carried thereby, means for holding one of the said members against longitudinal movement, a fluid-pressure engine mounted to rotate with the chuck for moving the other part longitudinally to operate the chuck, and means for limiting the movement of one of the members of the engine relative to the longitudinally-stationary member of the chuck, whereby the remaining movement of the engine is imparted to the longitudinally-movable members of the chuck.

11. The combination in a rotatable chuck, of a longitudinally-movable spindle, a work-gripping collet carried thereby, means for holding the collet against longitudinal movement, a pair of cranked levers mounted to engage with the spindle and the collet, to move the former longitudinally, and a fluid-pressure engine mounted upon the chuck to engage with the levers, and provided with a thrust member for engaging with the collet, and having a limited longitudinal movement relative thereto, of the extent required for operating the levers.

12. The combination in a rotatable chuck, of a longitudinally-movable spindle, a work-gripping collet carried thereby, means for holding the collet against longitudinal movement, a fluid-pressure cylinder, carried by the spindle, a piston coöperating therewith, and provided with a thrust member engaging with the collet, and having a limited longitudinal movement thereon for compelling longitudinal movement of the cylinder and its spindle.

13. The combination in a rotatable chuck, of a longitudinally-movable spindle, a collet and means for holding the collet against longitudinal movement, a cylinder for fluid-pressure carried by the spindle, a coöperating piston provided with a thrust member engaging with the collet, and having a longitudinal movement relative thereto, of an extent less than that of the total relative movement of the piston and cylinder, for compelling the remainder of that potential movement to be made by the cylinder and its spindle.

14. The combination in a rotatable chuck, of a longitudinally-movable spindle, a work-gripping collet carried thereby, means for holding the collet against longitudinal movement, a lever operatively engaging with the spindle and collet, a cylinder for fluid-pressure carried by the spindle, a coöperating piston engaging with the lever and provided with a thrust member engaging with the collet, and having a longitudinal movement relative thereto, less than the total relative movement of the piston and the cylinder for compelling a portion of that potential movement to be made by the cylinder and its spindle.

15. The combination with a rotatable chuck, of a double-acting fluid-pressure engine carried by the chuck, and means for conducting fluid-pressure thereto, comprising two non-rotating collars mounted upon the chuck, provided with separate supply passages and ports communicating with the respective sides of the engine, the said collars being separated by an intervening rotating collar.

16. The combination in a rotatable chuck of a double-acting fluid-pressure engine for operating the chuck, and means for conducting independent fluid-pressure supplies to the engine, comprising two non-rotating collars carried by the chuck, and provided with separate supply-passages communicating with the respective sides of the engine, the said collars being separated by an intervening rotating collar of the chuck, and being inclosed on their longitudinal outer faces by the rotating collars, one of which is longitudinally adjustable to take up the wear between the rotating and non-rotating collars.

Signed at Hartford, Connecticut, this 16th day of January, 1902.

BENGT M. W. HANSON.

Witnesses:
F. V. BARTLETT,
WM. H. HONISS.